(12) United States Patent
Capra

(10) Patent No.: US 10,138,111 B2
(45) Date of Patent: Nov. 27, 2018

(54) APPARATUS FOR REVERTING LIQUID FLOW BACK TO THE DEFAULT POSITION AFTER A SPECIFIC TIME

(71) Applicant: Joseph Maynard Capra, Hobe Sound, FL (US)

(72) Inventor: Joseph Maynard Capra, Hobe Sound, FL (US)

( * ) Notice: Subject to any disclaimer, the term of this patent is extended or adjusted under 35 U.S.C. 154(b) by 0 days.

(21) Appl. No.: 15/903,530

(22) Filed: Feb. 23, 2018

(65) Prior Publication Data

US 2018/0244512 A1   Aug. 30, 2018

Related U.S. Application Data

(60) Provisional application No. 62/463,116, filed on Feb. 24, 2017.

(51) Int. Cl.
  *B67D 7/22*   (2010.01)
  *B67D 7/36*   (2010.01)
  *B67D 7/08*   (2010.01)
  *B67D 7/46*   (2010.01)

(52) U.S. Cl.
  CPC ............. *B67D 7/222* (2013.01); *B67D 7/085* (2013.01); *B67D 7/362* (2013.01); *B67D 7/46* (2013.01)

(58) Field of Classification Search
  CPC ........ B67D 7/222; B67D 7/085; B67D 7/362; B67D 5/52
  See application file for complete search history.

(56) References Cited

U.S. PATENT DOCUMENTS

| | | | | |
|---|---|---|---|---|
| 3,133,610 A | * | 5/1964 | Sheppard | .................. F02D 9/00 123/363 |
| 3,670,628 A | * | 6/1972 | Borer | ...................... F15B 13/02 91/358 A |
| 2005/0194403 A1 | * | 9/2005 | Mink | .................. B01F 13/1058 222/135 |

* cited by examiner

*Primary Examiner* — Bryan Bui
(74) *Attorney, Agent, or Firm* — Dunlap Bennett & Ludwig PLLC

(57) ABSTRACT

A mechanical system for calibration during a chemical feed process includes a ball valve that includes three openings. The ball valve is in communication with a lever, which when turned to a fill position, allows the filling of a drawdown cylinder for calibration. The ball valve automatically returns to its original default position within about a minute with a spring force automatically pushing it back to its start position.

14 Claims, 5 Drawing Sheets

APPARATUS FOR REVERTING LIQUID FLOW BACK TO THE DEFAULT POSITION AFTER A SPECIFIC TIME

CROSS-REFERENCE TO RELATED APPLICATION

This application claims the benefit of priority of U.S. provisional application No. 62/463,116, filed on Feb. 24, 2017, the contents of which are herein incorporated by reference.

BACKGROUND OF THE INVENTION

This application relates to devices for calibrating chemical feed rates, or particularly, to a device for returning valves to a default position after a specific time.

Most commonly in manufacturing processes, chemical flow at steady rates are necessary. Often, operators will perform calibrations of these flows, but will forget to return the valves to original set point. This causes pumps to air lock or run dry, resulting in upsets in the process.

Other devices used to calibrate feed rates often require a two-valve system. One valve is used to control chemical or fluid feed from the tote or tank, and the other valve is used to open or close the calibration cylinder. In order to prevent disruption of chemical feed to the pump, both valves must be turned at the same time. This is usually difficult because the tester would have a timer in one hand.

There exists a need for a device that removed the opportunity for human error and can return a valve to the correct position after a predetermined time.

SUMMARY

Figure 1:
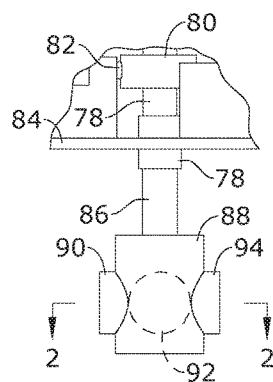
FIG. 1 shows a top view of the invention, showing the exemplary placement of a ball valve.

A mechanical system for calibration during a chemical feed process includes a ball valve having three openings, the three openings comprising a tote bin valve port, connected to a tote bin, a pump valve port connected to a pump, and a drawdown cylinder valve port connected to a drawdown cylinder. The system further includes a lever in communication with the ball valve. The tote bin valve port aligns with the tote bin, the pump valve port aligns with the pump, and the drawdown cylinder valve port aligns with the drawdown cylinder, allowing the drawdown cylinder to fill with a liquid to be calibrated, when the lever is rotated in a counter clockwise direction to a first position from a start position. The lever is capable of automatically rotating in a clockwise direction from the first position. The system further includes a timer in communication with the lever. The timer automatically sets to one minute when the lever automatically rotates in the clockwise direction to a second position. The lever and the ball valve move back to the start position when the one minute is complete. The system also includes a spring in communication with the ball valve. The spring moves the ball valve in clock wise direction back to the start position.

In one embodiment, the start position includes the tote bin valve port aligning with the tote bin, the pump valve port aligning with the pump, and the drawdown cylinder valve port being closed.

In one embodiment, the start position includes the lever being at a 360-degree position. In one embodiment, the first position includes the lever being at a 180-degree position. In one embodiment, the second position includes the lever being at a 270-degree position.

In one embodiment, the lever is rotated manually to the first position. In one embodiment, the ball valve moves automatically from the first position to the second position and to the start position with a force provided by the spring.

A method of calibrating a fluid during a chemical feed process includes using the mechanical system to fill the drawdown cylinder and calibrate the fluid while the ball valve returns to the start position.

DETAILED DESCRIPTION OF THE INVENTION

The following detailed description is of the best currently contemplated modes of carrying out exemplary embodiments of the invention. The description is not to be taken in a limiting sense, but is made merely for illustrating the general principles of the invention, since the scope of the invention is best defined by the appended claims.

An existing and commonly used method of chemical drawdown with a calibrated cylinder is currently used for a variety of chemical applications in manufacturing. This method is most popular for its accuracy and is often used to calibrate other process instruments. Other reasons for the use of this method include its mobility, use with various chemical properties, uninterrupted flow rates, and economic advantages. Most drawdown apparatuses can easily be relocated by disconnecting the line to the tote bin (usually by camlock). The drawdown calibration method can be used on a variety of chemical properties, such as viscosity, temperature, and density while producing consistent results. The calibration test can be performed without interrupting flow to the pump because the liquid is constantly supplied to the pump. This calibration test method is cost-effective in comparison to existing online flow meters and other technologies that can range in the several thousands of dollars.

Steps used in the current drawdown method of calibration include the following.

1. While the pump is operating normally, open the drawdown cylinder valve to fill liquid to the desired test level, and then close the valve.

2. Record the starting level of the drawdown cylinder.
3. Simultaneously open the drawdown cylinder while closing the tote bin valve and begin a one-minute countdown.
4. At the end of one minute, simultaneously close the drawdown cylinder while opening the tote bin valve.
5. Subtract the ending volume level from the starting volume level to determine flow rate per minute. An example would be 1000 ml starting level minus an 800 ml ending level equals 200 ml/min.

Most commonly in manufacturing processes, chemical flow at steady rates are necessary. Often, operators will perform calibrations of these flows, but forget to return the valves to original set point. This causes pumps to air lock or run dry, resulting in upsets in the process. The invention claimed here solves this problem.

Broadly, one embodiment of the present invention is a device that addresses the problem of interrupted chemical or fluid feed, due to human error of forgetting to return valves to normal position.

The described apparatus solves the problem of chemical feed interruptions due to human error. For example, an employee performs a calibration of chemical feed using a calibration cylinder attached to the suction side of a chemical feed. The employee closes the chemical valve at the suction side of the pump (usually a tote bin valve.) He then opens the calibration cylinder and measures the rate of flow. Once complete, the employee may forget to return the chemical feedback to normal. Thus, the pump then runs dry without a source of chemical, resulting in the loss of chemical feed to the process.

This described apparatus addresses the problem in the above example by automating the valve set point back to normal. After about 1 minute, the described apparatus automatically returns the chemical line back to normal by opening the source and closing the calibration cylinder.

The claimed invention differs from what currently exists, because the apparatus automatically returns valves to the normal position. Further, the claimed invention utilizes a single valve as opposed to multiple valves. Advantageously, it removes the possibility of human error or forgetfulness that causes valves to remain in the wrong position. Existing devices leave opportunity for human error to interrupt flow, typically due to forgetfulness. When using the claimed invention, if a tester forgets to return valves to the default position, the apparatus automatically returns the valve to the correct position after a predetermined time.

FIG. 1 shows one embodiment of a top view of the invention, showing the exemplary placement of a ball valve 88. The ball valve 88 includes a tote bin valve port 90, connected to a tote bin and a pump valve port 94 connected to a pump or chemical source. The ball valve 88 further includes a drawdown cylinder valve port 92 connected to a drawdown cylinder.

Figure 2:
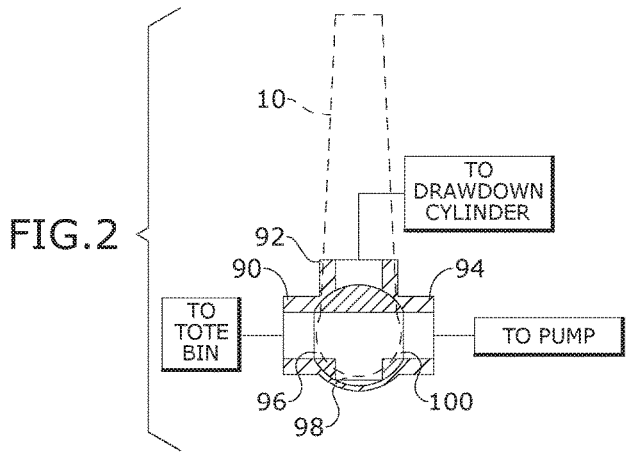
FIG. 2 is a schematic section view of the invention, taken along line 2-2 OF FIG.

The embodiment of FIG. 2 shows a schematic section view of the invention, taken along line 2-2 of FIG. 1. The device includes valve lever 10 with a first ball valve opening 96, a second ball valve opening 98, and a third ball opening 100 in their default positions.

In one embodiment, the ball valve 88 relates to the fluid flow in the valve positioning. The three openings 96, 98, and 100 allow the three functions of the apparatus. The functions are default, testing, and calibration cylinder filling. Valve lever 10 is used to select the desired function. A mechanical timer 46 is used to release the lever 10 after a predetermined time, which allows the ball valve 88 to return to the default position. A push button 50 offers the tester a quick release to return to default valve positioning, in the event the tester wishes not to wait for the timer 46. A lever or handle 10 is used to select the desired function. In one embodiment, one or more helical springs 80 are used to provide force to move the valve position back to default.

In one embodiment, at the default or start position, the lever remains at 360 degrees. At the fill or second position, the lever is rotated to 180 degrees. At the testing or second position, the lever is at 270 degrees.

Figure 3:
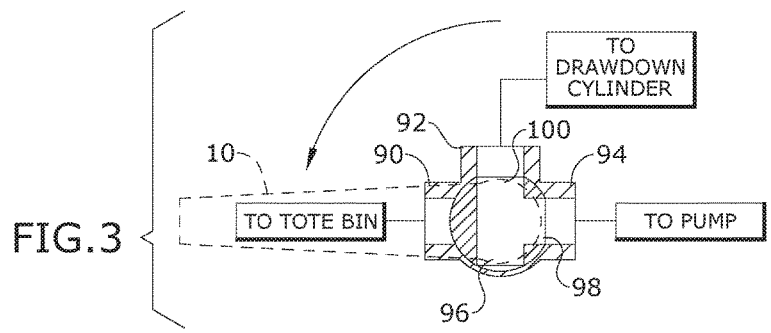
FIG. 3 is a schematic section view of the invention showing the turning of a lever 10.

In one embodiment, the calibration test is prepared by opening the drawdown cylinder valve port 92 and drawdown cylinder by rotating the lever 10 counterclockwise from the 360-degree position to the 180-degree position. It is rotated continuously and passes through the testing position, or the 270-degree position as shown in FIG. 3.

Figure 5:
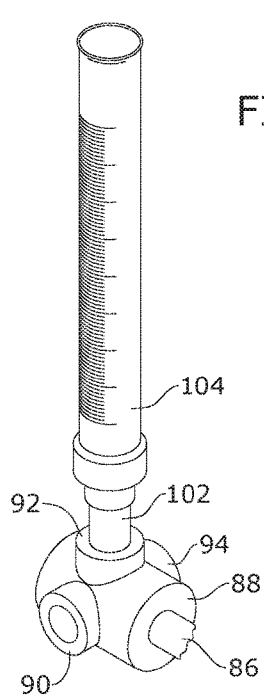
FIG. 5 is a detail perspective view of the invention, illustrating a drawdown cylinder.
Figure 4:
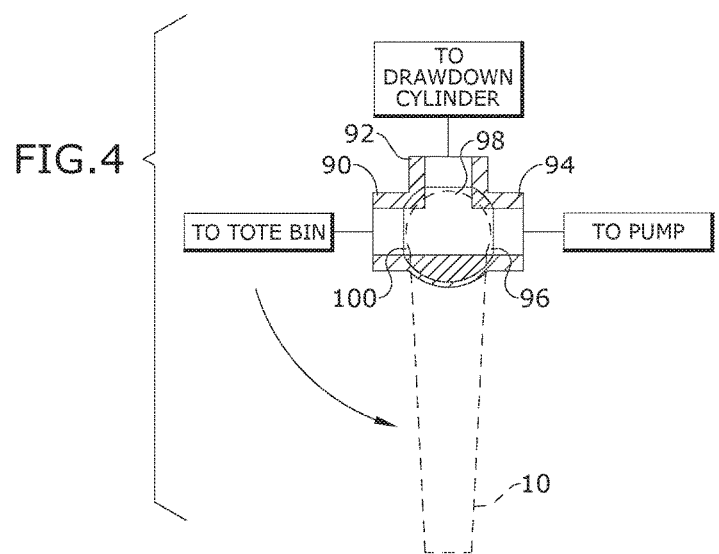
FIG. 4: is a schematic section view of the invention, showing the turning of a lever 10.

A drawdown cylinder 104 is filled by adjusting and holding the lever 10 at the 180-degree position as shown in FIG. 4 until filled as needed. At the fill position, the three ball valve openings (96, 98, 100) are aligned with their respective ports; the tote bin valve port 90, the drawdown cylinder valve port 92, and the pump valve port 94. Liquid passes from the tote bin valve port 90 to the drawdown cylinder valve port 92 by force of head pressure. Simultaneously the pump valve port 94 remains open allowing for continuous flow to the pump. The drawdown cylinder valve port 92 is thus, opened to a drawdown cylinder 104. As shown in the embodiment of FIG. 5, the drawdown cylinder 104 is connected to drawdown cylinder valve port 92 through a connecting nipple 102.

Once the drawdown cylinder 104 has been filled to the desired level, the valve lever 10 is released so that the lever rotates automatically backwards or clockwise to the 270-degree position. The 270-degree position initiates the one-minute timer 46 and holds the valve 88 in an unlocked position. Within a minute, the lever 10 automatically returns to the default position of 360 degrees.

Figure 6:
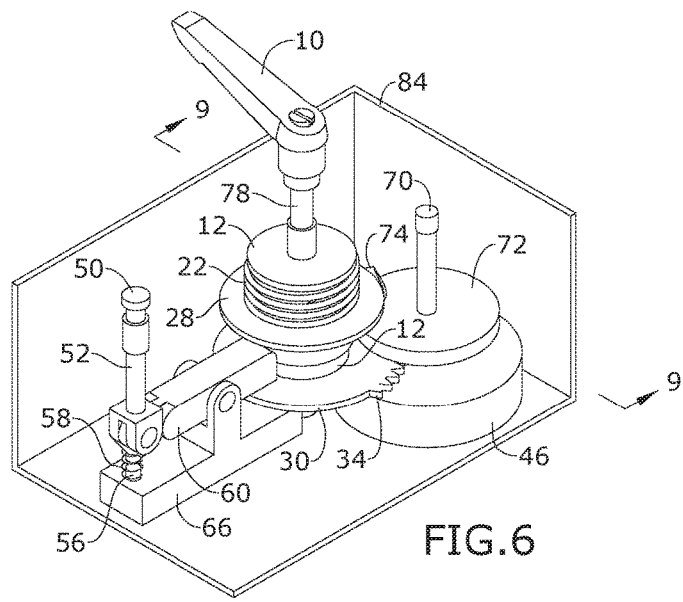
FIG. 6 is a perspective view of the invention, shown in a ratchet locked position.

In one embodiment as shown in FIG. 6, the ball valve system 88 is controlled by a mechanical system where the system is shown in a ratchet locked position or default position. The system includes the lever 10 attached to a main shaft 78, which is attached to a ratchet mechanism 12. The ratchet mechanism 12 includes a compression spring 22 and a triggering disc 28. It further includes a large gear 30 with a set of gear teeth 34, which are in communication with a cam disc 72 and a cam tooth 74. Cam disc 72 includes a cam timer shaft 70.

The system further includes a triggering disc 28 in communication with a return lever 60. The return lever 60 sits on a return level base 66. The return level includes a lower shaft 56, a shaft compression spring 58, a return shaft 52, and a return button 50. The system includes the one-minute time 46. The entire mechanical system is within a housing 84.

Figure 7:
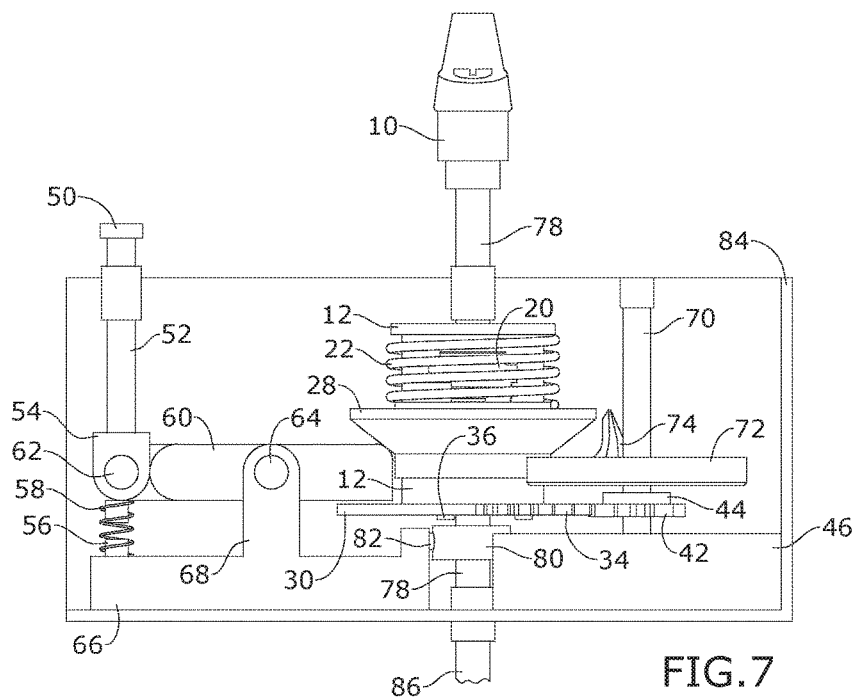
FIG. 7 is a front view of the invention, shown in a ratchet locked position.

As shown in the embodiment of FIG. 7, the system further includes a plurality of bolts 36, a one-way clutch 44, the helical spring 80, and the spring retention post 82. The one-way clutch 44 is in communication with the small gear 42. The return lever 60 includes a base fork 68 and a base fork pin 64. In one embodiment, the system is connected to a valve shaft 86 through main shaft 78.

Figure 8:
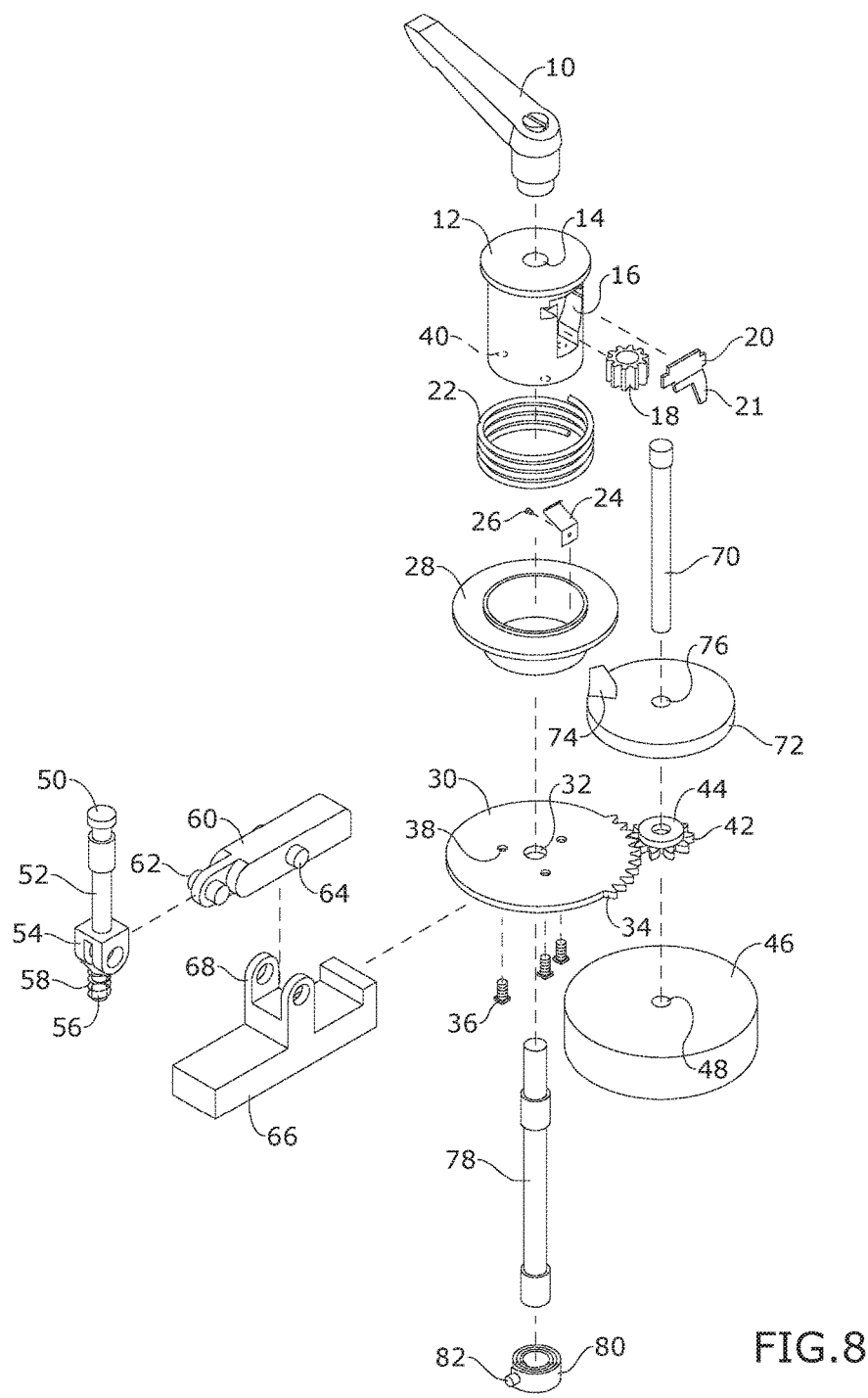
FIG. 8 shows an exploded view of the invention.

An exploded view of the system is shown in FIG. 8. Further details of the ratchet mechanism 12 are shown. Handle 10 is connected to ratchet mechanism 12 through shaft slot 14. Ratchet mechanism 12 further includes a shaft recess 16 with a ratchet gear 18 and a ratchet pawl 20 with a pawl locking tooth 21. Ratchet mechanism 12 further includes ratchet lock 24 attached to the triggering disc 28 with a ratchet lock fastener 24. Ratchet mechanism 12 also includes a plurality of ratchet mechanism bolt holes 40.

In one embodiment, cam shaft 70 fits into cam disc 72 through a cam slot 76. Cam shaft 70 is positioned through cam disc 72, one-way clutch 44, and shaft slot 48 to connect it to the timer 46. Helical spring 80 is within the spring retention post 82. The large gear 30 includes a plurality of bolt hole slots 38 to retain the plurality of bolts 36.

In one embodiment, the main shaft 78 is connected to the large gear 30, the triggering disc 28, the ratchet mechanism 12, and handle 10 through a shaft slot 32, and shaft slot 14 in the ratchet mechanism 12.

Figure 9:
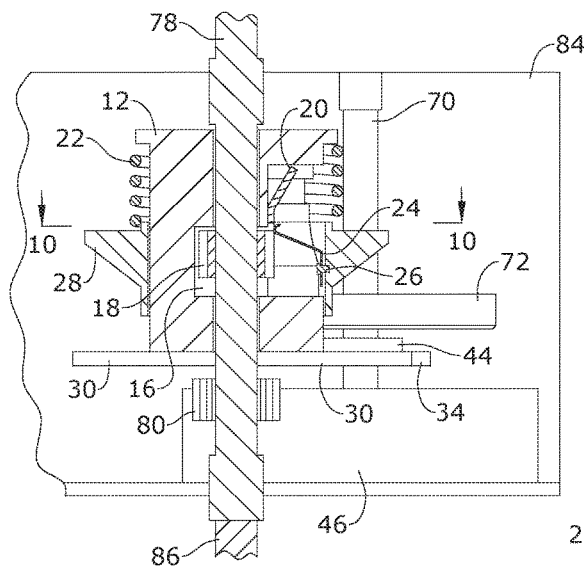
FIG. 9 is a section view of the invention, taken along line 9-9 of FIG. 6.
Figure 10:
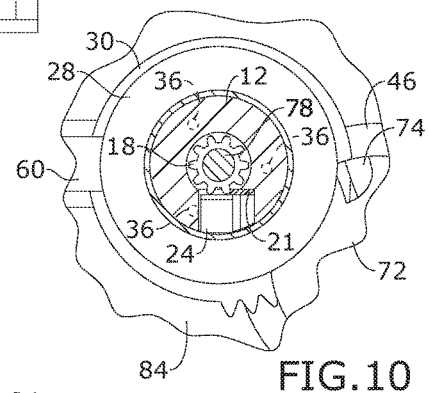
FIG. 10 is a section view of the invention, taken along line 10-10 of FIG. 9.

The embodiment of FIG. 9 shows a section view of the invention, taken along line 4-4 of FIG. 6. The embodiment of FIG. 10 shows a section view of the invention, taken along line 5-5 of FIG. 9.

Figure 11:
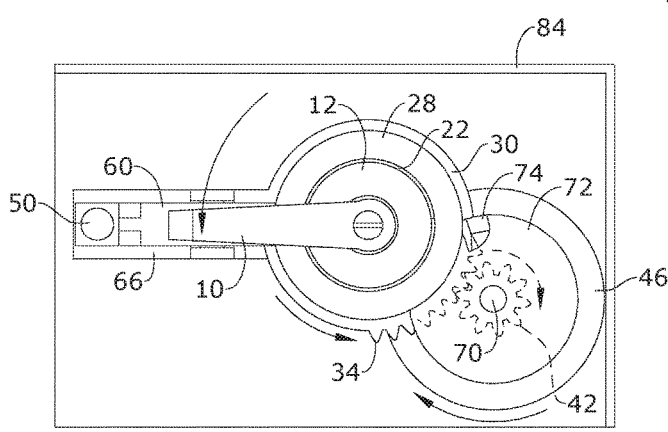
FIG. 11 is a top view of the invention, shown the turning of lever 10.

FIG. 11 shows one embodiment of the system in use. When the valve lever 10 is turned counter-clockwise manually, the ratchet mechanism 12 transmits the turning movement to the one-minute timer 46 through the large gear 30 which turns small gear 42 in a clock-wise direction. When the lever 10 automatically moves to 270 degrees, the timer 46 is automatically set to one minute. From the 270-degree position to the 180-degree position, there is no timing rotation transmitted to the timer 46 because the large gear 30 has only ten teeth and after ¼ of a turn, it does not transmit rotation any more.

The one-minute timer 46 is then set to 1 minute when the handle 10 reaches one turn clockwise (at the 270 position) and immediately starts rotating backwards turning the cam disc 72 counter clockwise. When the cam tooth 74 touches the triggering disk 28, it pushes it upwards and once at the top position, the ratchet lock 24 is disengaged from the ratchet mechanism 12 and the valve shaft 86. Due to the action of the compression spring 22 the ratchet mechanism 12 returns downwards immediately staying again in the locked position.

Figure 12:
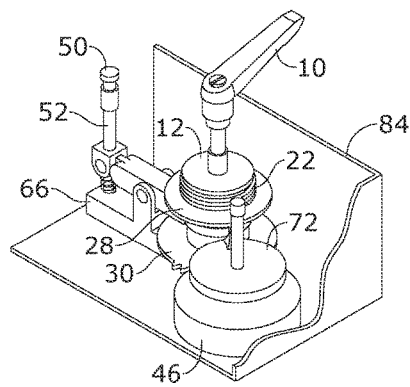
FIG. 12 is a rear perspective view of the invention.

At the locked position, the handle and ball valve are back in the default, or in the 360-degree position. The default position is shown in FIG. 12.

Figure 13:
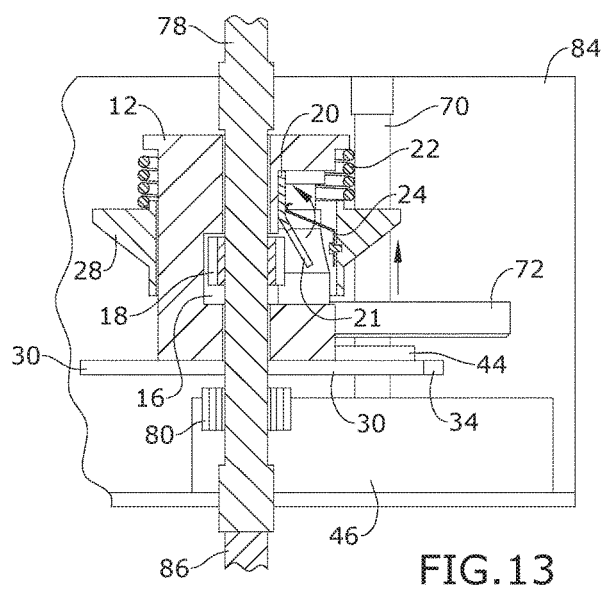
FIG. 13 is a section view of the invention.

FIG. 13 shows a section view of the invention, illustrating the raising of triggering disc 28 by cam tooth 74, releasing pawl 20 from ratchet gear 18.

Figure 14:
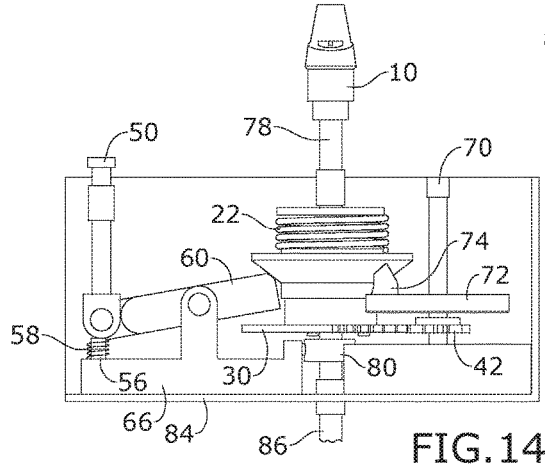
FIG. 14 is a top view of the invention, showing the raising of a triggering disc 28 using a lever 60.

In one embodiment as shown in the front view of FIG. 14, the procedure can be aborted manually if desired. To abort the procedure and return ball valve 88 to the locked 360-degree position, the return button 50 is pressed, which depresses the return shaft 52 and return shaft fork 54. This action leverages the return level 60 to lift the triggering disc 28 to disengage the ratchet lock 24 and returns the valve shaft 86 position with the force of helical spring 80.

In alternative embodiments, the positions of the handle 10 and ball valve can vary. For example, the default position need not be with the handle at 360 degrees, the fill position at 180 degrees, and the testing position at 270 degrees. The degrees of the positions can vary from 0-360, as long as they achieve a substantially similar function.

In another embodiment, the timer 46 is set to any suitable predetermined time period and is not limited to one minute to return to a default position.

Advantageously, the mechanical system is a mobile one, and can be disconnected and reattached in various chemical feed or other liquid feed/manufacturing processes with ease.

In alternative embodiments, an electrical element is used to perform the same functions as the mechanical components of the previously described mechanical system.

It should be understood, of course, that the foregoing relates to exemplary embodiments of the invention and that modifications may be made without departing from the spirit and scope of the invention as set forth in the following claims.

What is claimed is:

1. A mechanical system for calibration during a chemical feed process comprising:
    a ball valve having three openings, the three openings comprising:
        a tote bin valve port, connected to a tote bin;
        a pump valve port connected to a pump; and
        a drawdown cylinder valve port connected to a drawdown cylinder;
    a spring in communication with the ball valve, the spring biasing the ball valve to a start position;
    a lever in communication with the ball valve, the tote bin valve port aligning with the tote bin, the pump valve port aligning with the pump, and the drawdown cylinder valve port aligning with the drawdown cylinder, allowing the drawdown cylinder to fill with a liquid to be calibrated, when the lever is rotated in a first direction to a first position from the start position against the bias of the spring, the lever rotating in a second direction to a second position from the first position due to the bias of the spring; and
    a timer in communication with the lever, the timer automatically setting to a predetermined time when the lever rotates in the second direction to the second position, the lever and the ball valve rotating back to the start position when the predetermined time is complete due to the bias of the spring.

2. The mechanical system of claim 1, wherein the start position comprises the tote bin valve port aligning with the tote bin, the pump valve port aligning with the pump, and the drawdown cylinder valve port being closed.

3. The mechanical system of claim 1, wherein the start position comprises the lever being at a 360-degree position.

4. The mechanical system of claim 1, wherein the first position comprises the lever being at a 180-degree position.

5. The mechanical system of claim 1, wherein the second position comprises the lever being at a 270-degree position.

6. The mechanical system of claim 1, wherein the lever is rotated manually to the first position.

7. The mechanical system of claim 1, wherein the predetermined time is one minute.

8. A method of calibrating a fluid during a chemical feed comprising:
    filling a drawdown cylinder with the fluid to be calibrated by using a mechanical system, the mechanical system comprising:
        a ball valve having three openings, the three openings comprising:
            a tote bin valve port, connected to a tote bin;
            a pump valve port connected to a pump; and
            a drawdown cylinder valve port connected to a drawdown cylinder;
        a spring in communication with the ball valve, the spring biasing the ball valve to a start position;
        a lever in communication with the ball valve, the tote bin valve port aligning with the tote bin, the pump valve port aligning with the pump, and the drawdown cylinder valve port aligning with the drawdown cylinder, allowing the drawdown cylinder to fill with a liquid to be calibrated, when the lever is rotated in a first direction to a first position from the start position against the bias of the spring, the lever rotating in a second direction to a second position from the first position due to the bias of the spring; and a timer in communication with the lever, the timer automatically setting to a predetermined time when the lever rotates in the second direction to the second position, the lever and the ball valve rotating back to the start position when the predetermined time is complete due to the bias of the spring;

calibrating the fluid while the lever moves back to its start position.

9. The method of claim 8, wherein the start position comprises the tote bin valve port aligning with the tote bin, the pump valve port aligning with the pump, and the drawdown cylinder valve port being closed.

10. The method of claim 8, wherein the start position comprises the lever being at a 360-degree position.

11. The method of claim 8, wherein the first position comprises the lever being at a 180-degree position.

12. The method of claim 8, wherein the second position comprises the lever being at a 270-degree position.

13. The method of claim 8, wherein the lever is rotated manually to the first position.

14. The method of claim 8, wherein the predetermined time is one minute.

* * * * *